Feb. 19, 1952     J. JONAS     2,586,054
PUSHER TURBOPROP EXHAUST SYSTEM
Filed Aug. 21, 1948     2 SHEETS—SHEET 2
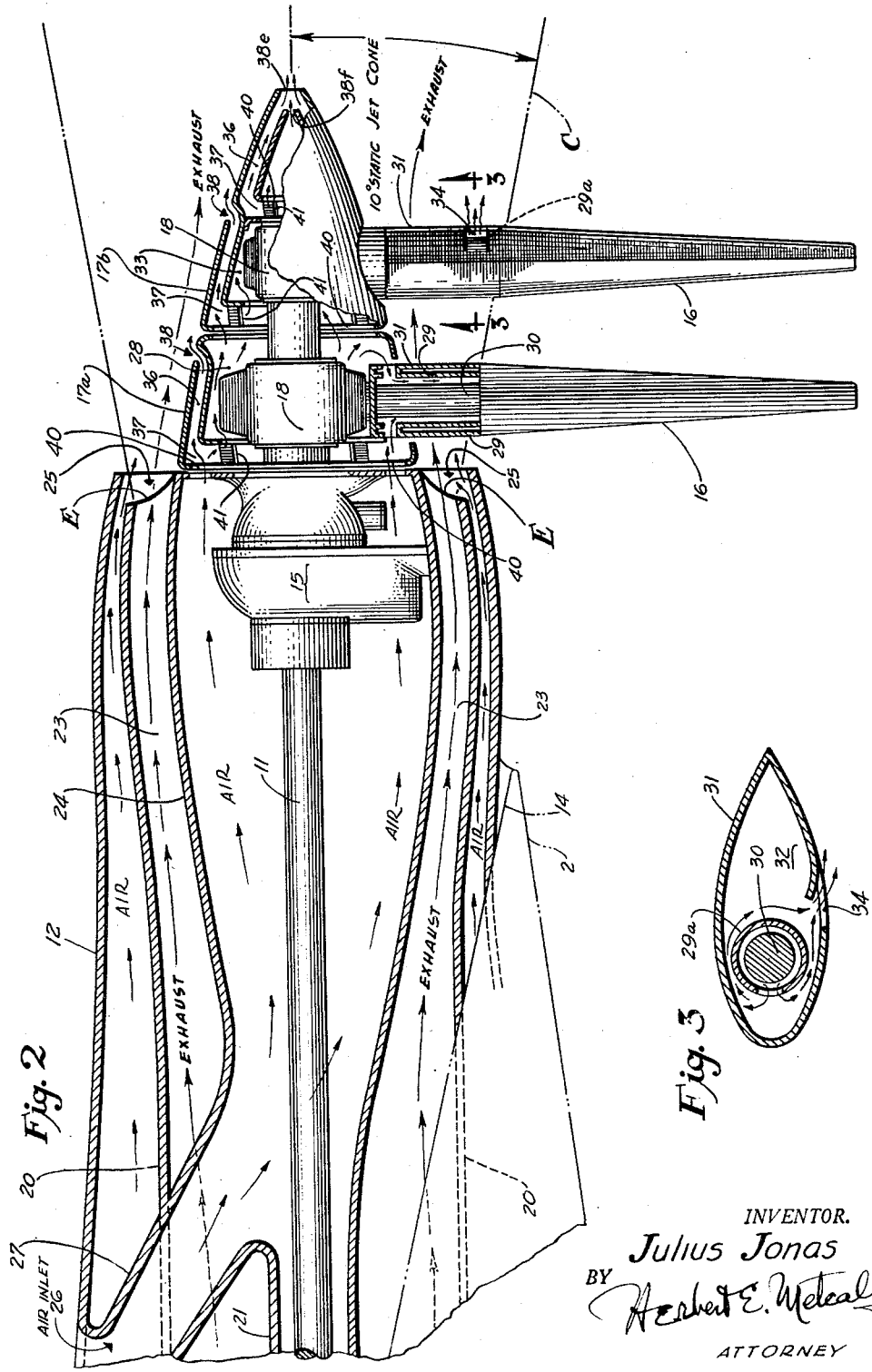
INVENTOR.
Julius Jonas
BY
ATTORNEY

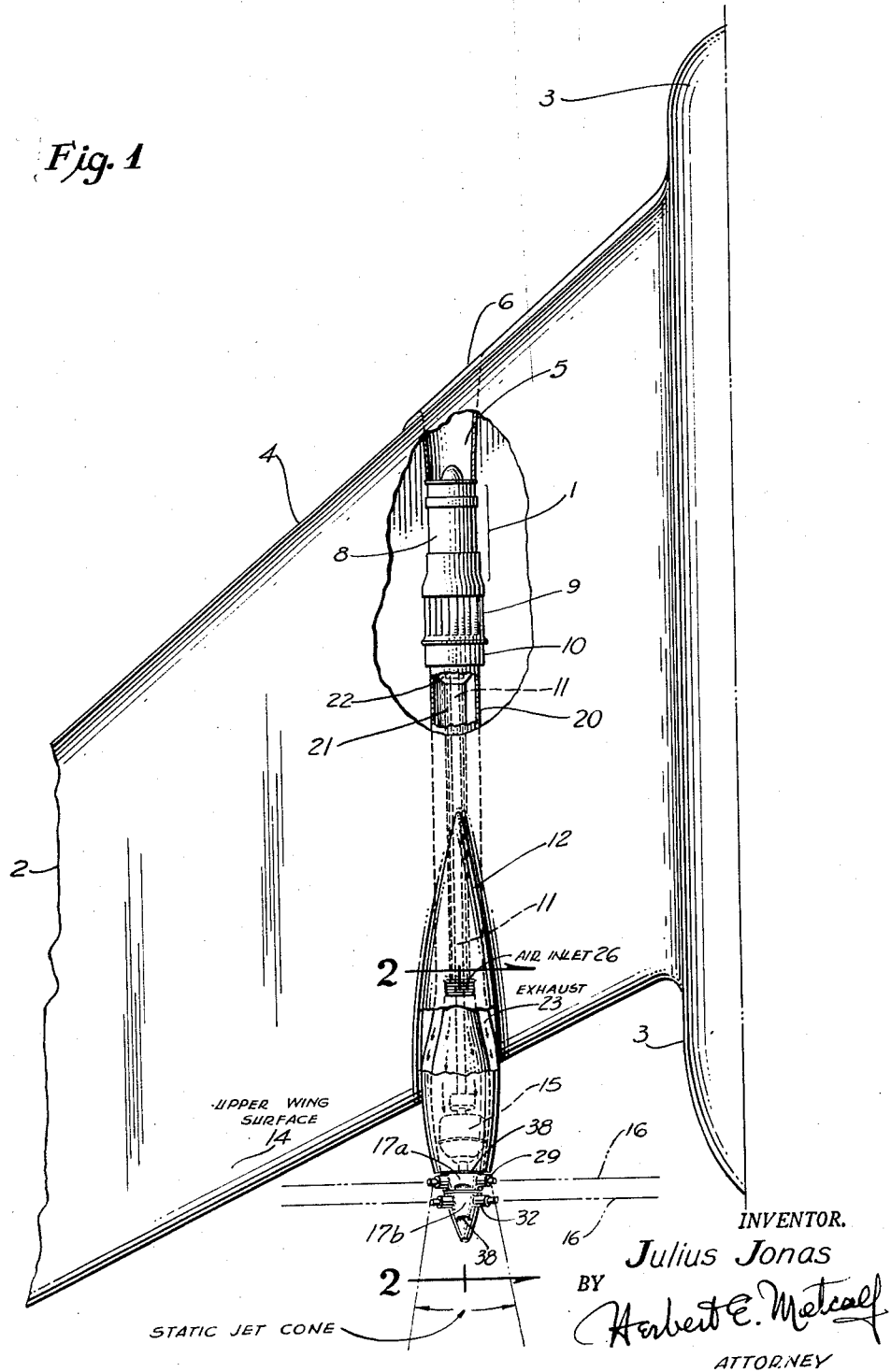

Patented Feb. 19, 1952

2,586,054

UNITED STATES PATENT OFFICE

2,586,054

PUSHER TURBOPROP EXHAUST SYSTEM

Julius Jonas, Los Angeles, Calif., assignor to Northrop Aircraft, Inc., Hawthorne, Calif., a corporation of California Application August 21, 1948, Serial No. 45,547

2 Claims. (Cl. 170—135.71)

My invention relates to jet engine exhausts for aircraft, and, more particularly, to jet engine exhausts for use in conjunction with gaseous combustion turbines connected to rotate pusher propellers, such engines being known in the art as turbo-prop engines.

In the use of gaseous combustion turbines for propelling aircraft by jet reaction alone, the high velocity, high temperature jet is directed rearwardly and exhausted into the atmosphere at the rear of the airplane. When turbo-jet engines are mounted well out in the wings, or in the center of the fuselage, no portion of the airplane is normally in the path of the hot expanding jet after it is vented. When such engines are offset only a short distance from the center line of the airplane the empennage is designed so that the control surfaces do not intercept gases from the jet. The jet, after leaving the tail pipe, usually has a static jet expansion cone whose sides are at an angle of about 10° to the center line of the jet. Thus, it is relatively easy, when turbo-jet propulsion is utilized, to design the airplane so that the jet, after leaving the tail pipe, avoids any substantial contact with the airplane structure.

It is also relatively easy to clear the hot exhaust gases of a turbo-prop engine when such an engine is driving tractor propellers, as the exhaust is vented to the atmosphere at the rear of the airplane, in the same general manner as in a turbo jet, and can also readily be made to clear the tail surfaces.

The problem, however, of what to do with the exhaust of a turbo-prop engine, when driving pusher propellers, is a difficult one.

Even when the maximum possible power is absorbed by the turbine in a turbo-prop engine, the exhaust gases are still very hot. For example, in a turbo-prop engine designed to develop 10,000 shaft horsepower, the exhaust gases are still at a temperature of about 1000° F. after leaving the turbine, although the veloctiy is relatively low, on the order of 500 to 600 M. P. H. This means that the static thrust provided by the exhaust will be in the neighborhood of 2,000 lbs., at sea level, substantially zero or less above 500 M. P. H. at sea level, and slightly positive at high altitudes.

Due to the fact that the gases in a turbo-prop engine flow axially and that the exhaust gases are concentrically emitted around the turbine shaft after leaving the turbine, several expedients have heretofore been proposed for venting the hot exhaust gases to the atmosphere when utilizing pusher propellers rotated by the turbine shaft.

In one of these expedients, the exhaust gases are deflected over an angle to pass the shaft and to exhaust, for example, below (or above) the shaft forward of the propeller, or propellers. This venting can, with certain airplane configurations, be placed sufficiently far forward so that the gases are cool enough when passing through the propeller to avoid overheating the propellers. However, the presence of a hot, one-sided exhaust gas column, through which the major thrust producing portions of the propeller blades must intermittently rotate, introduces undesirable vibrations and high stresses into the propellers, and in high power installations such conditions cannot be tolerated.

Another type of exhaust system for pusher turbo-prop installation in wing panels has been proposed, avoiding passage of the exhaust gases through the propellers. This type of system directs the exhaust gases, first laterally in the wing panel and then outwardly to vent the gases beyond the propeller travel disc, so that no gas passes through the propellers. This system has the disadvantage of requiring relatively long exhaust ducts, thereby increasing weight, and of placing bends in the tail pipe. These bends lead to the development of back pressure on the turbine, reducing the shaft horsepower developed thereby. A more important disadvantage of such a system, however, is that the space required in the wing panel to accommodate the duct is excessive. In the 10,000 horsepower turbo-prop engine, referred to above, the interior cross-sectional area of the exhaust duct is 5½ square feet. With this engine rotating 17 ft. propellers, the duct can be assumed to require a minimum length of 10 ft., or more, within the wing, thus when insulated directly utilizing more than 55 cubic feet of space that might well be better used for fuel, bombs, cargo, etc. Actually, the presence of such a duct will prevent efficient use of a much larger space within the wing.

Thus, for various reasons, none of the heretofore proposed methods of handling the exhaust from a turbo-prop engine have proved satisfactory in practice when pusher propellers are rotated thereby.

It is an object of the present invention to provide a means and method of directly venting the exhaust gases of a turbo-prop engine driving pusher propellers, through the propellers without the use of tail pipe bends and without resulting in propeller vibration or heat damage thereof.

In broad terms, I provide a vent for the exhaust gases from a turbo-prop engine driving pusher propellers on an airplane, opening only at the roots of the propeller blades, this vent preferably being concentric with the propeller shaft or shafts in case contra-rotating propellers are utilized. The exhaust gases, impinging on the roots of the propellers do not interfere with the propulsive efficiency of the propellers, as it is only the outer portions of the blades that provide significant thrust. Means are provided to cool the portions of the propeller blades and mounting moving in the hot gases. In this manner, a straight rearward jet is obtained with a minimum of weight and utilizing a minimum of useful space.

My invention may be more fully understood by reference to the appended drawings in which:

Figure 1 is a schematic top plan view, partly cut away, of a gas turbine installation driving contra-rotating propellers mounted on the swept-back wing panel of an all-wing airplane.

Figure 2 is a diagrammatic longitudinal view, partly in section and partly in elevation, of a preferred form of the turbine exhaust and propeller cooling system of the present invention taken as indicated by the line 2—2 in Figure 1.

Figure 3 is a diagrammatic cross-sectional view of a rear propeller blade root and shroud, slightly enlarged, taken as indicated by line 3—3 in Figure 2, and rotated 90° clockwise.

The invention will be described as applied to an all-wing airplane equipped with two 10,000 shaft horsepower gas turbine engines, each driving contra-rotating pusher propellers. Such engines are presently being built and operated under the trade-marked name of "Turbodyne" by the Turbodyne Corporation, a wholly owned subsidiary of the assignee of the present application, Northrop Aircraft, Inc.

Referring first to Figures 1 and 2, the gaseous combustion turbine 1 for one side of the airplane is mounted on swept-back wing panel 2 outboard of a crew nacelle 3. The turbine is preferably mounted just rearwardly of the leading edge 4 of the wing panel 2 to provide a relatively short air duct 5 leading to an air intake 6 in the leading edge 4 of the wing panel.

In the gas turbine 1 the air entering duct 5 is compressed in a compressor section 8, heated in a combustion section 9 and expanded in a turbine section 10, as is customary in gas turbines. As the gas turbine 1 is to provide shaft power, the turbine section 10 will contain a multistage turbine providing power in excess of that required to drive the compressor in the compressor section 8 and this excess power is transmitted aft through drive shaft 11 turning at turbine speed. Shaft 11 then passes into a drive shaft housing 12 emerging from the upper wing surface 14 of the wing panel and terminates in a gear box 15 held at the rear end of housing 12. Gear box 15 carries concentric propeller shafts on which are mounted three bladed contra-rotating propellers 16 faired by spinner sections 17a and 17b around the hubs 18 thereof. It is customary to provide a blade feathering device in the hubs 18 so that the blades can be feathered or even reversed in pitch as desired.

In Figure 2, the propellers 16 are shown at zero pitch with the forward propeller drawn to indicate clockwise rotation, the rear propeller being shown as rotating counterclockwise.

The exhaust gases from the turbine section emerge concentrically around drive shaft 11 and are led directly aft by an insulated tail pipe 20, positioned around shaft 11, shaft 11 being protected by a shaft insulation sleeve 21 forming an elongation of turbine rear bearing cone housing 22 (Figure 1).

Insulated tail pipe 20 continues aft into drive shaft housing 12 where it is expanded into a heat insulated, preferably annular, exhaust duct 23 around a heat insulated gear box cone 24 enclosing gear box 15. The diameter of the exhaust annulus is reduced somewhat as the end of the drive shaft housing is approached, and the exhaust duct ends in a preferably annular exhaust vent 25 positioned just outside of the inner propeller spinner section 17a.

It is customary to terminate a jet tail pipe with an air ejecting end positioned to move air over the insulation around the tail pipe. An ejecting end for the exhaust duct 23 is indicated at E in Figure 2, the ejector being designed to move air from an inlet (not shown) over the outside of the tail pipe and between the exhaust duct and the propeller shaft housing.

The exhaust gases thus emerge at the roots of the propeller blades, so that as the blades revolve, the portions thereof contacted by the gases are close to the blade hubs, thereby eliminating any possibility of blade vibration. As little or no thrust is developed by the root sections of propeller blades, the reduction in propeller thrust due to the hot gas ring is negligible. As the area of the exhaust ring intercepted by the blade roots is small, compared to the total ring area, a large portion of the energy of the exhaust gases, when available for jet thrust, is so utilized.

However, the exhaust gases at the vent 25 are still hot, about 1000° F. in an installation as above described. Consequently, means are provided for cooling the propeller blade roots contacted by the exhaust gases, and for cooling the spinner section 17a and 17b.

The gear box cone 24 is made to be hollow, and is connected to a cooling air inlet 26 on the upper surface of drive shaft housing 12 through a heat insulated strut 27 passing through the exhaust duct 20.

The cooling air entering the gear box cone 24 is preferably at static pressure or at only a slightly positive pressure, to avoid the drag offered by an intake airscoop. This air can pass around gear box 15 to enter a front spinner compartment 28 and then pass outwardly between a propeller blade axle shroud 29, extending outwardly around each axle 30 and the axle to a point at the periphery of the jet cone, the latter being indicated by broken line C. This cone has a 10° slope when the airplane is stationary, assuming a somewhat lesser slope in flight due to the air flow past the exhaust annulus. In Figure 2, the root of the front propeller is shown in section, the root of the rear propeller being shown in elevation.

Each blade axle 30 of the rear propellers is provided with a somewhat longer rear axle shroud 29a taking air from the rear spinner section 33.

Shrouds 29 and 29a are of cylindrical shape and are concentric with the circular sections of axles 30. The exterior surface of the propeller blade roots 31 as they emerge from the spinners are also of circular section so that the blades can be rotated for pitch change. Just beyond the spinners, however, the propeller cross-section changes to airfoil contour, as shown in Figure 3. The shrouds 29 and 29a then open into plenum chambers 32 formed between the shrouds and the propeller blade root walls.

From the plenum chambers 32, the air passes out through the blade surface via exits 34 positioned on the rear side of the trailing edge of each of the propeller blades, just at the edge of the exhaust cone, so that maximum air ejection effect can be obtained from the passage of air and the exhaust gas thereover during rotation of the propellers. The air is thus moved from inside the spinner sections 17a and 17b over the blade axles 30. The materials forming the propeller root walls and the shrouds are such as to be able to withstand the heat of the exhaust gases, such as stainless steel, for example.

Inasmuch as the shrouds extend outwardly along the blade extent, the centrifugal force produced on the air within the shrouds also aids in producing the required circulation, and in some instances where the heating effect of the exhaust gases is not too high, centrifugal force alone can be relied on to produce sufficient air circulation to cool the blade roots.

While I have shown the shrouds 29 and 29a attached to and rotating with the propeller blades 16 as the blade angles are changed, it is also practical to attach shrouds 29 and 29a and the outer walls of the propeller blade roots 31 to the hubs 18. In this case both the shrouds 29 and 29a and the blade roots would again be of circular section, with only the blades and their axles rotating when the blade angle is changed. Under these circumstances, no gap will be needed between the spinner sections and the blade roots.

As the spinner sections 17a and 17b are also contacted by the exhaust gases, it is also desirable to cool them. This is accomplished by making the spinner section walls double to provide an air space 36 between them. Air enters the air space 36 through inlet slots 37 in the inner walls, passes between the walls, and exits through aspirating openings 38 in the outer wall placed rearwardly of inlet slots 37. Here, as with the blade shrouds, centrifugal force can be used to increase the air circulation by placing spaced annular rings 40 forward and aft of the slots 37 and providing these rings with spaced cross vanes 41 to rotate the air between rings 40 so that centrifugal force will add to the ejection force provided by the aspirating openings 38.

One aspirating opening 38e is positioned at the tip of rear spinner section 17b. The aspirating action of this tip opening not only moves air between the double walls of the spinner section, but also will move air out of the spinners when the spinner section is provided with an inner tip opening 38f alined with aspirating opening 38e.

As the gas in the jet is expanding outwardly from the spinner sections is it not necessary for these spinner sections to be sealed at the housing-inner spinner section junction, at the front-rear spinner section junction or at the propeller blade root-spinner junction. The differential pressure developed aids in moving the air outwardly at the junctions mentioned, and a slight gap at these junctions is preferred.

In this manner, all of the exhaust gases from the turbine can be passed through the propeller without causing vibration thereof and without heat damage to the propeller blades. However, as many other methods of cooling the blade roots and spinner sections will be apparent to those skilled in the art, I do not desire to be limited to the particular cooling system shown and described herein, as other forms such as, for example, a positive drive blower system, can be utilized within the scope of the appended claims.

Furthermore, while I have described the preferred form of exhaust vent as being fully annular, it may be desirable to provide access to the gear box through the exhaust duct for example, thus interrupting the complete encirclement of the spinners by the exhaust gases. When the exhaust is thus interrupted, the interruption does not lead to the development of vibration as the intermittent blade pressures are developed close to the blade insertion, and the bending moments are therefore low. For this reason, I do not wish to be limited to the use of a completely annular vent, as the main object of the invention is met by confining the exhaust gas impact to the roots of the blades close to the insertion thereof in the hubs.

What is claimed is:

1. In an airplane, a gaseous combustion turbine, a drive shaft forming an extension of the shaft of said turbine and extending rearwardly thereof, a multiple bladed pusher propeller connected to be rotated by said drive shaft, an exhaust duct carrying gases from said turbine positioned around said drive shaft and terminating in an exhaust vent forward of and adjacent the roots only of the blades of said propeller, a hollow spinner fairing the junction of said drive shaft and said propeller blades, means for conducting outside air into the interior of said spinner, a shroud around each of the root portions of said blades in the path of the exhaust gases, said shroud being spaced from said root portion, each of said shrouds having an opening over which exhaust gases pass, said opening being shaped to eject air from between said shrouds and said roots, said spaces between said shrouds and said roots being connected to receive air from within said spinner.

2. In an airplane, a gaseous combustion turbine, a drive shaft forming an extension of the shaft of said turbine and extending rearwardly thereof, a multiple bladed pusher propeller connected to be rotated by said drive shaft, an exhaust duct carrying gases from said turbine positioned around said drive shaft and terminating in an exhaust vent forward of and adjacent the roots only of the blades of said propeller, the junction of said drive shaft and said propeller blades is faired by a hollow spinner, means for conducting outside air into the interior of said spinner, a shroud around each of the root portions of said blades in the path of the exhaust gases, said shroud being spaced from said root portion, each of said shrouds having an opening over which exhaust gases pass, said opening being shaped to eject air from between said shrouds and said roots being connected to receive air from within said spinner and wherein said spinner has double walls, together with means for moving air from within said spinner between said walls.

JULIUS JONAS.

REFERENCES CITED

The following references are of record in the file of this patent:

UNITED STATES PATENTS

| Number | Name | Date |
| --- | --- | --- |
| 1,386,493 | Guyot | Aug. 2, 1921 |
| 2,026,885 | Goddard | Jan. 7, 1936 |
| 2,160,281 | Price | May 30, 1939 |
| 2,233,031 | Price | Feb. 25, 1941 |
| 2,403,797 | Hersey | July 9, 1946 |
| 2,409,446 | Pavlecka et al. | Oct. 15, 1946 |
| 2,426,635 | Mercier | Sept. 2, 1947 |
| 2,434,319 | Kalitinsky | Jan. 13, 1948 |
| 2,446,663 | Palmatier | Aug. 10, 1948 |
| 2,488,783 | Stalker | Nov. 22, 1949 |

FOREIGN PATENTS

| Number | Country | Date |
| --- | --- | --- |
| 586,577 | Great Britain | Mar. 24, 1947 |
| 588,096 | Great Britain | May 14, 1947 |
| 592,883 | Great Britain | Oct. 2, 1947 |